United States Patent [19]

Hynd et al.

[11] 4,142,730
[45] Mar. 6, 1979

[54] LOADING AND UNLOADING MECHANISM FOR RECORD DISK APPARATUS

[75] Inventors: Martin W. Hynd, Glenrothes; James M. O'Reilly, Tillicoultry; Alexander S. Murison, Kirkcaldy, all of Scotland

[73] Assignee: Burroughs Corporation, Detroit, Mich.

[21] Appl. No.: 728,698

[22] Filed: Oct. 1, 1976

[30] Foreign Application Priority Data

Oct. 3, 1975 [GB] United Kingdom ............... 40493/75

[51] Int. Cl.² ............................................. G11B 5/82
[52] U.S. Cl. ........................................ 274/9 B; 360/99
[58] Field of Search ............................. 360/97, 99, 93; 274/9 B, 1 R

[56] References Cited

U.S. PATENT DOCUMENTS

| | | | |
|---|---|---|---|
| 2,670,210 | 2/1954 | Thompson | 274/9 B |
| 3,770,908 | 11/1973 | Craggs | 360/97 |
| 3,815,150 | 6/1974 | Stoddard et al. | 360/99 |
| 3,890,643 | 6/1975 | Dalziel | 360/99 |
| 3,899,794 | 8/1975 | Brown | 360/97 |
| 3,940,793 | 2/1976 | Bleiman | 360/99 |

Primary Examiner—Richard E. Aegerter
Assistant Examiner—John W. Shepperd
Attorney, Agent, or Firm—Gerald J. Woloson; Benjamin J. Barish; Edward J. Feeney, Jr.

[57] ABSTRACT

A recorder for a cartridge-enclosed disk includes a loading and unloading mechanism which utilizes a cam and cam-follower to enable a cartridge-receiver unit to automatically open the recorder's pivoted door when the receiver unit itself pivots from an operative to a loading/unloading position. The cam and cam-follower also enable the door to pivot the receiver unit to the operative position when the door is manually closed following insertion of the disk cartridge. A manually-releasable latch holds the receiver unit in its operative position against the action of a pivot-inducing bias spring. Until activated to allow the receiver unit to force open the door, the same latch also holds the door in its closed condition.

4 Claims, 5 Drawing Figures

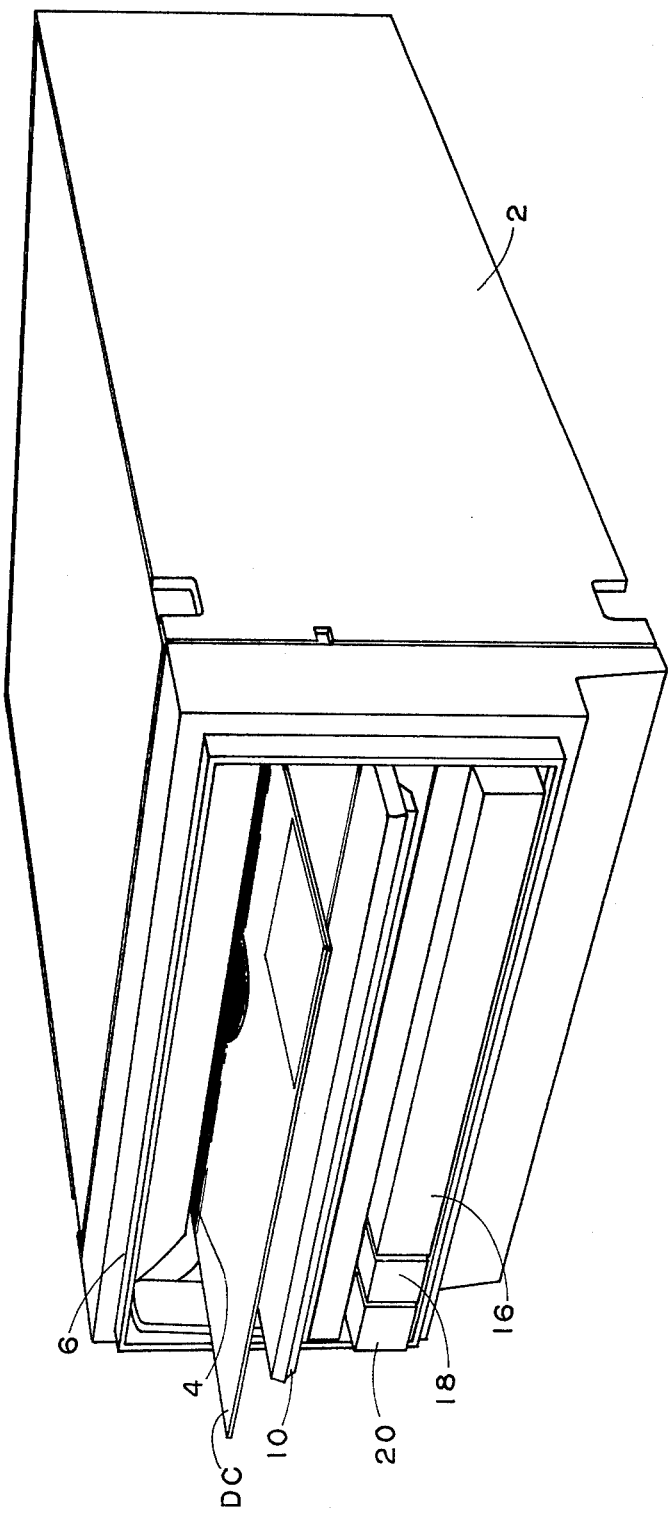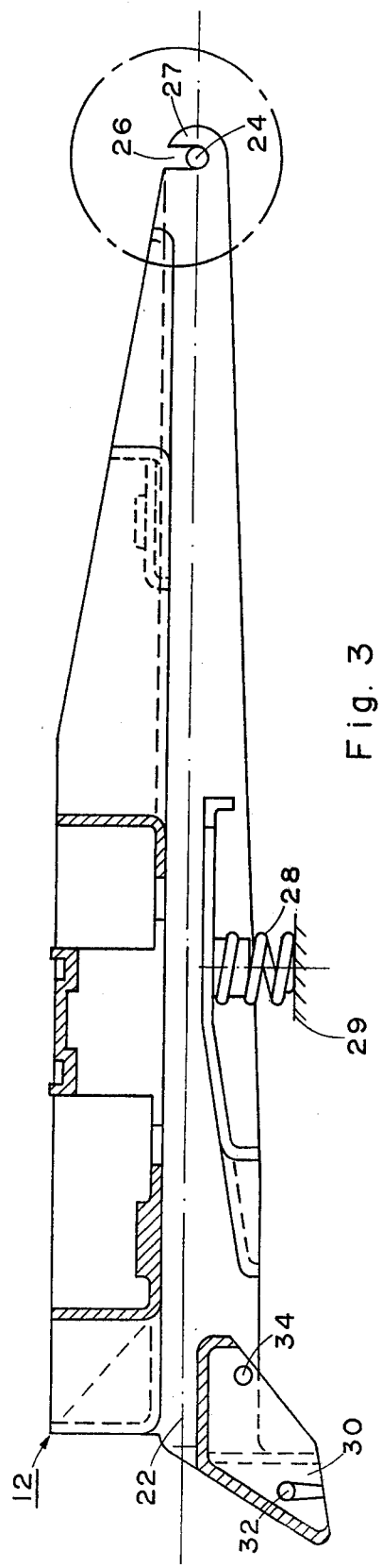

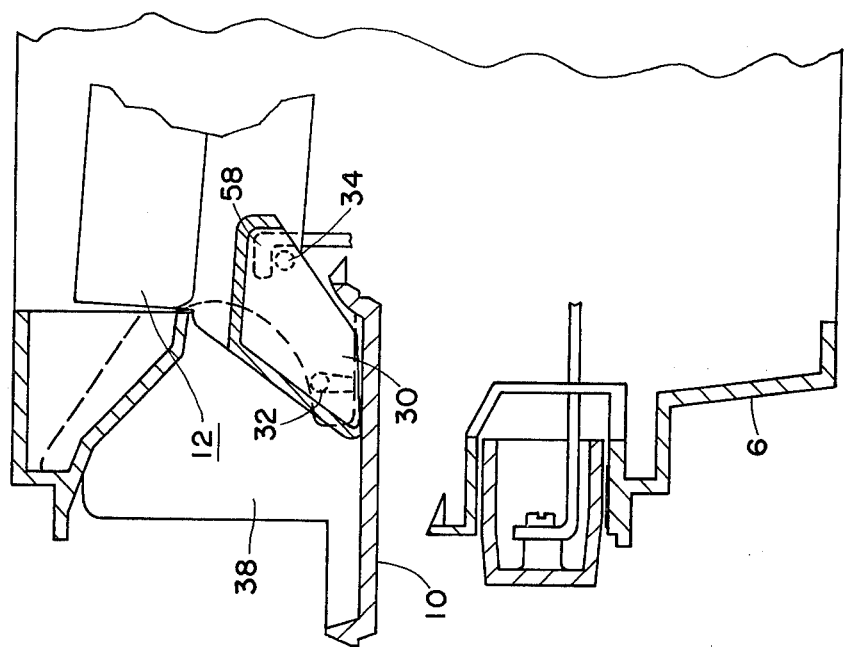
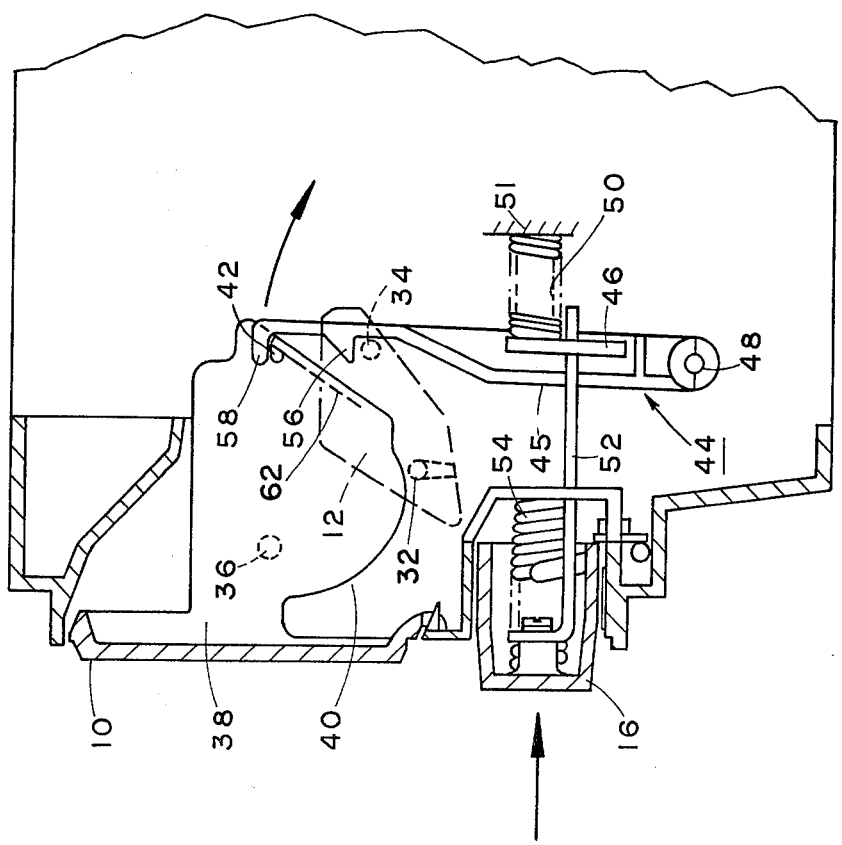

LOADING AND UNLOADING MECHANISM FOR RECORD DISK APPARATUS

BACKGROUND OF THE INVENTION

The present invention relates to loading and unloading mechanisms for record disk apparatus. The invention is particularly useful in apparatus wherein the record disk is in the form of a disk cartridge, such as a flexible or "floppy" disk cartridge, and is therefore described below with respect to such apparatus.

SUMMARY OF THE INVENTION

According to the present invention, there is provided record disk apparatus comprising: a housing; a disk receiver pivotably mounted within the housing from an operative position to a loading-unloading position; spring means urging the disk receiver to its loading-unloading position; a door pivotable from a closed condition when the disk receiver is in its operative position, to an open condition when the disk receiver is in its loading/unloading position; a locking assembly including a catch engageable with the disk receiver for securing same in its operative position against the action of said spring means; and a releasing member for actuating the locking assembly to release the disk receiver to move to its loading/unloading position; said disk receiver and door including a cam surface carried by one, contacted by an element carried by the other, effective to cause the disk receiver to open the door when the disk receiver is moved by its spring to its loading/unloading position, and to cause the door to move the disk receiver to its operative position when the door is manually closed.

According to a further feature of the invention, the locking assembly includes a further catch engageable with the door for securing the door in its closed condition, said latter catch also being released when the locking assembly is actuated by the releasing member, to release the door to move to its open condition.

Record disk apparatus constructed in accordance with the foregoing features of the invention enable a record disk, such as a disk cartridge, to be loaded into the apparatus and unloaded therefrom in a simple and convenient mannner.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a perspective view from the side, of one form of record disk apparatus constructed in accordance with the invention;

FIG. 3 is a transverse sectional view of the disk receiver;

FIG. 4 is a side view, partly in section, showing the main parts of the apparatus in the door-closed condition; and FIG. 5 is a fragmentary view corresponding to that of FIG. 4 but illustrating the parts in the door-open condition.

DESCRIPTION OF THE PREFERRED EMBODIMENT

Figure 2:
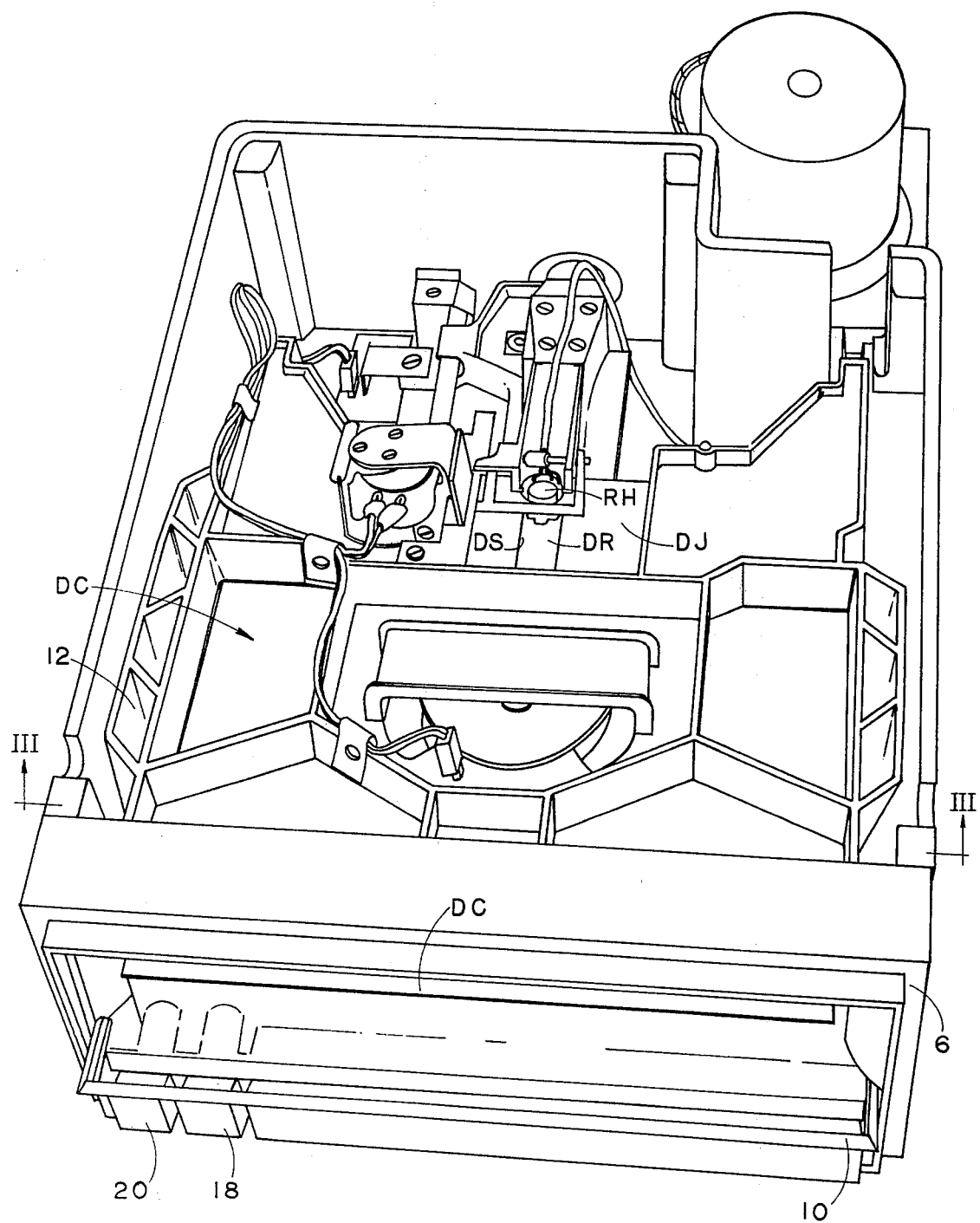
FIG. 2 is another perspective view, from above, of the apparatus of FIG. 1 with the housing top wall removed in order to show internal structure.

The apparatus illustrated in the drawings is for use with a disk cartridge DC, e.g., a "floppy" disk cartridge. Such cartridges include a flexible record disk DR (FIG. 2) of plastic material having a magnetic coating for recording information thereon, the disk being enclosed within a jacket DJ of cardboard or plastic having an elongated radial slot DS for accessing the magnetic recording head RH to the magnetic coating on the disk. The present invention is particularly directed to the loading and unloading mechanism enabling the disk cartridge to be loaded into and unloaded from the apparatus in a simple and convenient manner.

The apparatus illustrated in the drawings comprises a housing, generally designated 2, having an elongated opening 4 in its front wall 6 for inserting and removing the disk cartridge DC. Opening 4 is closed by a door 10 pivotably mounted within the front wall 6 of the housing. When door 10 is opened as illustrated in FIG. 1, a cartridge receiver 12 (FIGS. 2 and 3) within the housing is moved to its raised or loading/unloading position, to enable the insertion or removal of the cartridge with respect to opening 4; and when door 10 is closed, the cartridge receiver is moved to its lower or operative position. In the latter position, the disk cartridge DC is disposed so that its slot DS formed in its jacket DJ is aligned with the Read/Write head RH within the housing, enabling the latter to record or reproduce information from the record disk DR exposed by the jacket slot DS.

After the disk cartridge DC has been loaded into the apparatus through opening 4, as shown in FIG. 1, door 10 may be manually pivoted closed, which moves the cartridge receiver 12 downwardly to its operative position. The door 10 may be opened, and the cartridge receiver 12 moved to its upper loading/unloading position, by pressing a release bar 16 in the front wall 6 of the housing. Front wall 6 further includes a pair of indicator lamps 18, 20 to indicate the condition of the apparatus.

The cartridge receiver 12, best seen in FIGS. 2 and 3, is formed with a slot 22 for receiving the disk cartridge DC. The receiver is pivotably mounted by means of pins 24 fixed within the housing 2 and received in slots 26 formed on rear extensions 27 of the disk receiver, and is urged upwardly by means of a spring 28 interposed between a fixed member 29 in the housing and the lower face of the receiver. At the front end, the disk receiver is formed with a pair of side extensions 30 each carrying two pins 32, 34. Pins 32 cooperate with the door 10, and pins 34 cooperate with the locking mechanism released by release bar 16, as will be more fully described below.

Door 10 is pivotably mounted in the front wall 6 of the housing by a pair of pins (FIGS. 4, 5) engageable with a pair of side extensions 38 carried by the door. The lower ends of extensions 38 are formed with curved cam surfaces 40 cooperable with pins 32 of the cartridge receiver 12. The rear edges 42 of extensions 38 cooperate with the locking assembly which secures the door 10 in its closed condition and the cartridge receiver 12 in its lowered, operative position both as shown in FIG. 4.

The locking assembly generally designated 44 and best seen in FIGS. 4 and 5, includes a pair of end arms 45 connected together by a cross-bar 46, the assembly being pivotably mounted at its lower end by pins 48.

The locking assembly 44 is urged to its locking condition (as illustrated in FIG. 4) by means of a spring 50 interposed between cross-bar 46 and a fixed member 51 within the housing, but may be pivoted to its unlocking condition by means of the previously-mentioned release bar 16 having a connection 52 to cross-bar 45 of the locking assembly. Release bar 16 is movable inwardly and outwardly of front wall 6 and is urged to its outer locking condition by means of spring 54.

Arms 45 of locking assembly 44 are each formed with a pair of catches or hooks 56, 58. When the locking assembly is in its locking condition (as illustrated in FIG. 4), hooks 56 engage pins 34 of the carriage receiver extensions 30 securing the cartridge receiver 12 in its operative (lower) position. Hooks 58 engage edges 42 of the door extensions 38 securing the door 10 in its closed condition. Pressing release bar 16, however, pivots the locking assembly 44 (clockwise in FIG. 4), causing its hooks 56 and 58 to disengage from pins 32 and from edges 42, thereby releasing the door 10 and cartridge receiver 12 for movement in the manner described below.

The record disk apparatus illustrated operates as follows: Assuming the parts are in the door-closed condition illustrated in FIG. 4, it will be seen that the door 10 is secured in the closed condition by hooks 58 of the locking assembly 44 engageing edges 42 of the door side extensions 38, and that the cartridge receiver 12 is secured in its lower or operative position by hooks 56 of the locking assembly engaging pins 34 of the cartridge receiver extensions 30. The apparatus is thus in its operative condition in which the door 10 is closed and the disk cartridge DC received within slot 22 of the cartridge receiver 12 is properly positioned with respect to recording head RH (FIG. 2).

Now, if it is desired to remove the disk cartridge, release bar 16 is pressed inwardly. This pivots locking assembly 44 clockwise, causing its hooks 56 to disengage from pins 34 of the cartridge receiver 12, and also hooks 58 to disengage from edges 42 of the door 10. The cartridge receiver 12 is thus allowed to pivot upwardly under the influence of spring 28. During this upward movement of the cartridge receiver, its pins 32 ride along the lower cam surfaces 40 of the door side extensions 38, causing the door to be pivoted to its open condition about pivot points 36. The pressing of release bar 16 thus causes both the cartridge receiver 12 to pivot upwardly to its loading/unloading position, and the door 10 to pivot upwardly to its open condition, as shown in FIG. 5.

The disk cartridge DC within slot 22 of the cartridge receiver 12 may then be removed and another cartridge inserted.

After loading a new cartridge, door 10 is manually pivoted downwardly to its closed condition. During this movement, its cam surfaces 40 on its side extensions 38, engaging pins 32 on the side extensions 30 of the disk receiver 12, pivot the disk receiver downwardly about pivot 24 and against spring 20. As the disk receiver is lowered, pins 34 act on the top surfaces of hooks 56, pushing assembly 44 back. This allows hooks 58 to clear edges 42. Hooks 58 spring back over edges 42 as pins 34 drop under hooks 56. The apparatus then is in its locked and operative recording or reproducing condition with magnetic head RH aligned with slot DS in the disk cartridge.

While the invention has been described with respect to a preferred embodiment, it will be appreciated that many variations, modifications and other applications of the invention can be made

What is claimed is:

1. Loading and unloading apparatus for a disk recording and reproducing unit, comprising:
   A. a housing means including a disk insertion aperture means;
   B. disk receiver means including receiver pivoting means;
   C. first pivotal mounting means, connected to said housing, and cooperating with said receiver pivoting means, for enabling said disk receiver means to pivot from an operative position to a loading/unloading position;
   D. spring means for biasingly urging said disk receiver means to the loading/unloading position;
   E. door means including door pivoting means;
   F. second pivotal mounting means, connected to said housing, and cooperating with said door pivoting means, for enabling said door means to pivot back and forth from a closed condition when said disk receiver means is in the operative position, to an open condition when said disk receiver means is in the loading/unloading position;
   G. locking means for releasably securing said disk receiver means in the operative position against the biasing action of said spring means;
   H. releasing means for actuating said locking means to release said disk receiver means to move, under the biasing action of said spring means, to the loading/unloading position;
   I. cam means mounted on said door means, and cam-follower means for engaging said cam means, said cam-follower means mounted on said disk receiver means, said cam means and cam-follower means for together enabling said disk receiver means to apply the rotation-producing force on said door means to pivot said door means from the closed condition to the open condition when said disk receiver means is moved by said spring means to the loading/unloading position, and for together enabling said door means to pivot said disk receiver means from the loading/unloading position to the operative position when said door means is pivoted from the open condition to the closed condition.
   J. said disk receiver means including receiver side extension means, mounted on said disk receiver means, for carrying said cam-follower means, said receiver side extension means including receiver engagement means for cooperating with said locking means to releasably secure said disk receiver means in the operative position;
   K. said locking means including door retention means for releasably securing said door means in its closed condition when said disk receiver means is in its operative position, said door retention means also being released when said releasing means is actuated; and
   L. said door means including door side extension means, mounted on said door means, for carrying said cam means and for carrying said door pivoting means, said door side extension means including door engagement means for cooperating with said door retention means to releasably secure said door means in the closed condition.

2. Apparatus according to claim 1 wherein:
   A. said receiver side extension means includes a pair of receiver side extensions;

B. said door side extension means includes a pair of door side extensions;
C. said locking means includes a pair of arms having first catches engagable with said receiver engagement means; and
D. said door retention means includes a second catch mounted on each of said arms.

3. Apparatus according to claim 2 wherein:
   A. said receiver engagement means comprise pins; and
   B. said door engagement means comprise edges.

4. Apparatus according to claim 3 wherein said locking means further comprises:
   A. cross bar means connected to the pair of said arms; and
   B. locking spring means for biasingly urging said locking means to its locking condition.

* * * * *